Sept. 2, 1930.  V. WILLOUGHBY  1,774,690
SAFETY VALVE
Filed Feb. 24, 1928
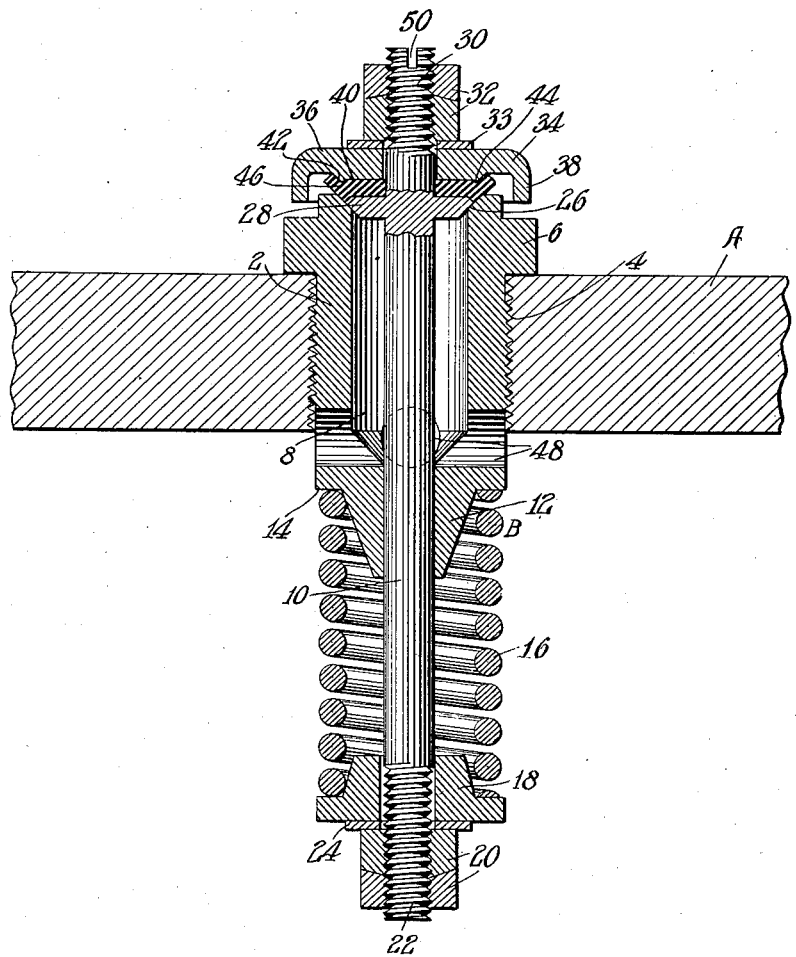
Inventor
Victor Willoughby
By his Attorney
F. H. Gibbs Patented Sept. 2, 1930

1,774,690

UNITED STATES PATENT OFFICE

VICTOR WILLOUGHBY, OF RIDGEWOOD, NEW JERSEY, ASSIGNOR TO AMERICAN CAR AND FOUNDRY COMPANY, OF NEW YORK, N. Y., A CORPORATION OF NEW JERSEY

SAFETY VALVE

Application filed February 24, 1928. Serial No. 256,686.

Reference is had to the accompanying drawings which illustrate the preferred form of the invention; though it is to be understood that the invention is not limited to the exact details of construction shown and described, as it is obvious that various modifications thereof within the scope of the claims will occur to persons skilled in the art.

In the drawings:

The figure is a vertical sectional view of the valve.

This invention relates to safety valves, and it is one object of the invention to provide an improved safety valve for use in tanks or other like devices where such valves are desirable.

Another object of the invention is the provision of a safety valve of the kind described in which leakage is prevented by the utilization of a suitable gasket.

A further object of the invention is the provision of a safety valve having a gasket for preventing leakage, which gasket is replaceable while there is pressure in the tank.

Other objects and advantages of this invention will be apparent from the following description taken with the accompanying drawings in which A indicates a portion of a tank, or any other suitable container with which a safety valve indicated generally at B is employed. The valve B comprises primarily a casing 2 which is threadedly engaged in the tank or receptacle as shown at 4 and is provided with a collar 6 adjacent the upper edge of the casing for limiting the positioning of the valve, as will be apparent; the collar being adapted to seat on the outer surface of the tank A.

The casing is providing with a longitudinal bore 8 through which a valve stem 10 extends, the latter extending through a frusto-conical guide 12, which is, in effect, the reduced lower end of the casing 2. This reduced end or guide 12 defines a bearing surface or flange 14 against which a spring 16 seats. The outer end of the spring 16 is supported by a follower 18 carried or supported by nuts 20 adjustable on the threaded lower end 22 of the valve stem. For obvious purposes, a washer 24 is interposed between the nuts 20 and the follower 18.

The inner upper edge of the casing 2 is formed to provide a seat 26 for a valve 28 arranged intermediate the ends of the valve stem but adjacent the upper end thereof, and said upper end of the valve stem is reduced and exteriorly threaded as at 30 to receive nuts 32 which serve to secure a protective cap 34 mounted on the valve stem; a suitable washer 33 being interposed between the lower nut 32 and the cap 34 for an obvious purpose.

The cap 34 is more particularly of the form shown, being of inverted dish shape and having a base 36 and a depending annular flange 38 which overlaps the upper end of the casing 2. The inner surface of the base is provided with a central projection or bearing surface 40 having an annular bevelled edge 42 and a circumferential rib 44 which is adapted to restrain a resilient gasket 46 against lateral shifting and which serves to position said gasket. The gasket 46 is of a diameter greater than the upper surface of the valve 28 so as to overlie the juncture of the valve and valve seat to prevent leakage. Further, the gasket 46, being of resilient material, readily conforms to the shape shown when the nuts 32 are screwed home to secure the cap in position with the bearing portion 40 in engagement with the gasket. It will be obvious from an inspection of the drawings that when the cap is being secured against the gasket, the edge of the gasket will be forced upwardly due to the engagement of the rib 44 so that the upper annular edge of the gasket will be arranged in engagement with the bevelled surface 42, and further, it will be apparent that the gasket will be forced to engagement with the valve seat; the arrangement providing in effect a gasket having an annular upwardly extending flange which conforms to the shape of the valve seat and the bevelled surface 42.

The casing 2 is provided with transverse bores 48 adjacent its lower end, and just above the frusto-conical guide 12, which bores or passages communicate with the longitudinal bore 8 whereby to established communication from the interior of the tank or other receptacle to the atmosphere when pressure within the tank is sufficient to raise the valve from its seat.

The upper end of the valve stem 10 is provided with a slot 50 for engagement by a suitable tool whereby to adjust the nuts 20 on the threaded end 22 to take up or ease the tension of the spring 16 to effect proper operation of the safety valve.

It is believed that the operation of the safety valve just described will be fully apparent to those skilled in the art without further elaboration, but attention is called to the fact that the device of the present invention is of extreme simplicity, and is strong and durable in construction, and in addition, the parts are so connected that by backing off the nuts 32 and removing the cap 34 it is possible to replace the gasket 46 while there is pressure in the tank; the valve 28 serving to effectually seal the interior of the valve casing against leakage.

What is claimed is:

1. In a safety valve, a hollow casing open at its upper end and having its upper inner edge beveled to provide a valve seat, the lower end of said casing being closed and provided with an externally arranged apertured extension having an annular shoulder defining a spring seat, inlet passages formed in the wall of said casing and communicating with the interior thereof, a valve stem arranged in the casing and extending through the aperture in the extension, a valve intermediate the ends of said stem and normally seating on a portion only of the valve seat, a spring seat on the valve stem, a spring interposed between said spring seats for normally retaining the valve on its seat, an annular shoulder formed on the casing adjacent the upper edge thereof, a cap on the upper end of the valve stem having a depending marginal flange and an internal annular projection, a gasket secured to said valve by the cap and engaging the valve seat, the said projection serving to aid the gasket in effecting a seal at the juncture of the valve and valve seat, said marginal flange on said cap skirting the upper end of the casing when the valve is in seated position.

2. In a safety valve, a hollow casing open at its upper end and having its upper inner edge beveled to provide a valve seat, the lower end of said casing being closed and provided with an externally arranged apertured extension having an annular shoulder defining a spring seat, inlet passages formed in the wall of said casing and communicating with the interior thereof, a valve stem arranged in the casing and extending through the aperture in the extension, a valve intermediate the ends of said stem and normally seating on a portion only of the valve seat, a spring seat on the valve stem, a spring interposed between said spring seats for normally retaining the valve on its seat, a gasket carried by the valve and co-operating with the valve seat to effect a seal at the juncture of the valve and valve seat, and a gasket securing element carried by the valve stem and held against said gasket, said element having an internal projection embedded in said gasket.

3. In a safety valve, a hollow casing having a valve seat at its upper end and having its lower end closed and provided with an externally arranged apertured extension having an annular shoulder defining a spring seat, inlet passages formed in the wall of said casing and communicating with the interior thereof, a valve stem extending through the aperture in said extension and having its ends arranged outside of the casing, a valve and a gasket normally co-operating with the valve seat to effect a closure, said gasket being accessible for replacement while said valve is in its seated position and subjected to fluid pressure, a spring seat adjacent the lower end of the valve stem, and spring means interposed between said spring seats for normally retaining the valve on its seat.

In witness whereof I have hereunto set my hand.

VICTOR WILLOUGHBY.